United States Patent [19]

Kasai et al.

[11] Patent Number: 4,942,022
[45] Date of Patent: Jul. 17, 1990

[54] CATALYTIC REACTOR

[75] Inventors: Hiroshi Kasai, Tokyo; Yuji Kawamoto, Chiba, both of Japan

[73] Assignee: Toyo Engineering Corporation, Tokyo, Japan

[21] Appl. No.: 139,609

[22] Filed: Dec. 30, 1987

[30] Foreign Application Priority Data

May 18, 1987 [JP] Japan .................. 62-118961

[51] Int. Cl.$^5$ .............................................. B01J 8/04
[52] U.S. Cl. ................... 422/201; 422/148; 422/198; 422/200
[58] Field of Search ............... 422/148, 192, 200, 201, 422/198

[56] References Cited

U.S. PATENT DOCUMENTS

| 4,372,920 | 2/1983 | Zardi | 422/148 |
| 4,637,918 | 1/1987 | Osman et al. | 422/148 |
| 4,769,220 | 9/1988 | Zardi | 422/148 |

FOREIGN PATENT DOCUMENTS 2152405 8/1985 United Kingdom .

Primary Examiner—Robert J. Warden
Assistant Examiner—Jill Johnston
Attorney, Agent, or Firm—Flynn, Thiel, Boutell & Tanis

[57] ABSTRACT

A catalytic reactor includes a reactor vessel, a catalyst bed and at least two heat exchangers. The catalyst bed and heat exchangers are arranged coaxially with the central axis of a reactor vessel and substantially at the same height.

9 Claims, 4 Drawing Sheets

F I G. 1
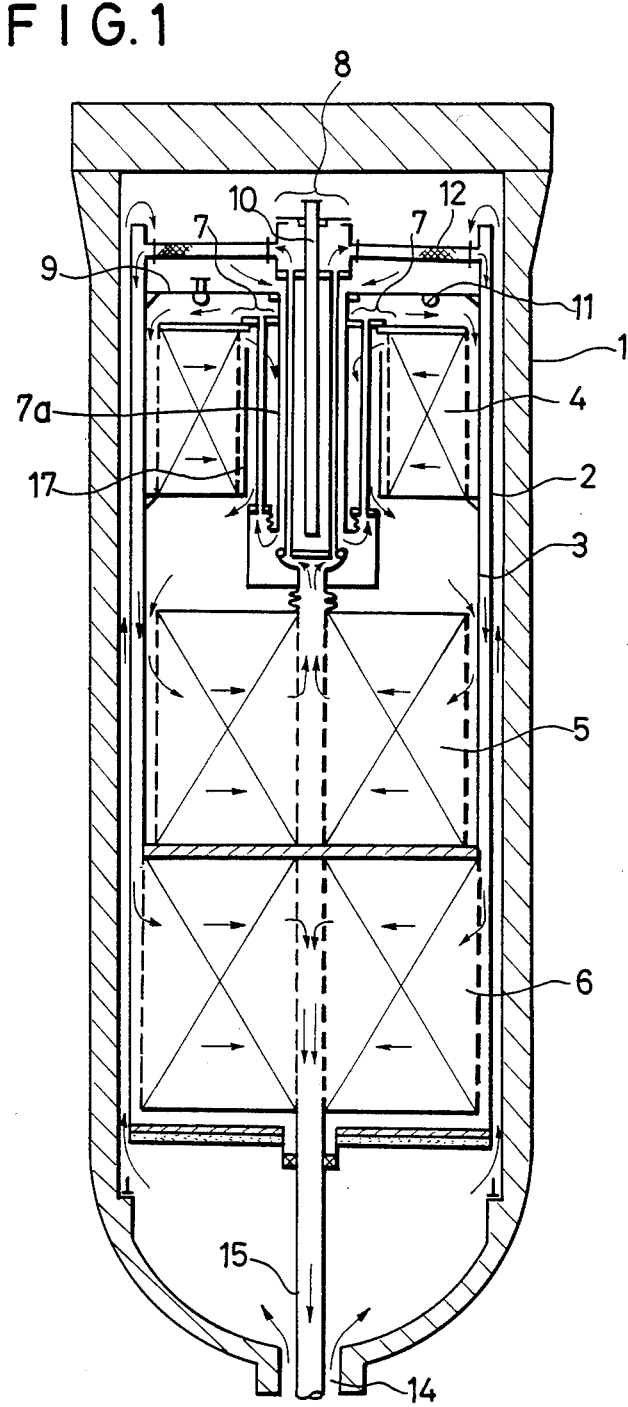

CATALYTIC REACTOR

BACKGROUND OF THE INVENTION

This invention relates to a catalytic reactor for bringing a gaseous starting material into contact with a solid catalyst to cause an exothermic conversion reaction and hence to obtain a gaseous reaction product.

It is conventional, in a catalytic reactor, to divide a catalyst bed into plural smaller beds and to interpose a heat exchanger between each two successive ones of the smaller catalyst beds, so that the temperature in each smaller catalyst bed can be maintained at the level most suitable for the desired reaction whereby to cause the reaction to proceed to the maximum extent. Among the vertical catalytic reactors known to date, there are those equipped individually with such smaller catalyst beds, each of which is constructed of gas-transmitting inner and outer cylinders which are closed at both upper and lower ends thereof. Each catalyst bed is annular in transverse cross-section and has a cylindrical external shape and allows the reaction gas to flow radially therethrough so that the pressure drop of the gas that is passed through the catalyst bed can be reduced.

Among the prior art catalytic reactors, the following recent publications are mentioned.

Japanese Patent Laid-Open No. 81129/1981
Japanese Patent Laid-Open No. 110328/1985
Japanese Patent Laid-Open No. 179131/1985

In the catalytic reactors of these publications, each heat exchanger is located, for example, in the open central space of an annular catalyst bed or in a space above or below the catalyst bed within a reactor vessel.

In the aforementioned prior art, the catalyst beds and heat exchangers are arranged rather simply within the space of a reaction vessel. Maintenance and running costs were, however, not fully taken into consideration. They have, inter alia, one or more of the following drawbacks.

(1) The catalytic reactors have complex internal structures and their manufacturing costs are high.

(2) It is troublesome and time-consuming to assemble and disassemble their heat exchangers. It is impossible to take out the heat exchangers until after the catalyst has been removed completely. Their maintenance is thus difficult to perform, leading to higher repair costs.

(3) The heat exchangers are designed in accordance with the quantities of heat to be generated in their corresponding catalyst beds. It is, however, very difficult to match the size of a heat exchanger, which is to be installed, with the size of its corresponding catalyst bed because the space provided for receiving the heat exchanger is limited.

SUMMARY OF THE INVENTION

An object of this invention is to solve the above-described drawbacks and to provide a novel catalytic reactor featuring easy maintenance and a low manufacturing cost.

In the catalytic reactor of this invention, a catalyst bed and at least two heat exchangers are provided coaxial with the vertical central axis of a reactor vessel and at substantially the same vertical height. Namely, the heat exchangers whose structures are complex are arranged together at a location permitting easy maintenance, for example, in the uppermost part of the reactor, whereby their maintenance is facilitated and at the same time the cost required for their maintenance is reduced.

BRIEF DESCRIPTION OF THE DRAWINGS

FIG. 1 is a vertical cross-section of one embodiment of a reactor for the synthesis of ammonia in which the present invention has been incorporated;

DESCRIPTION OF THE PREFERRED EMBODIMENTS

Figure 2:
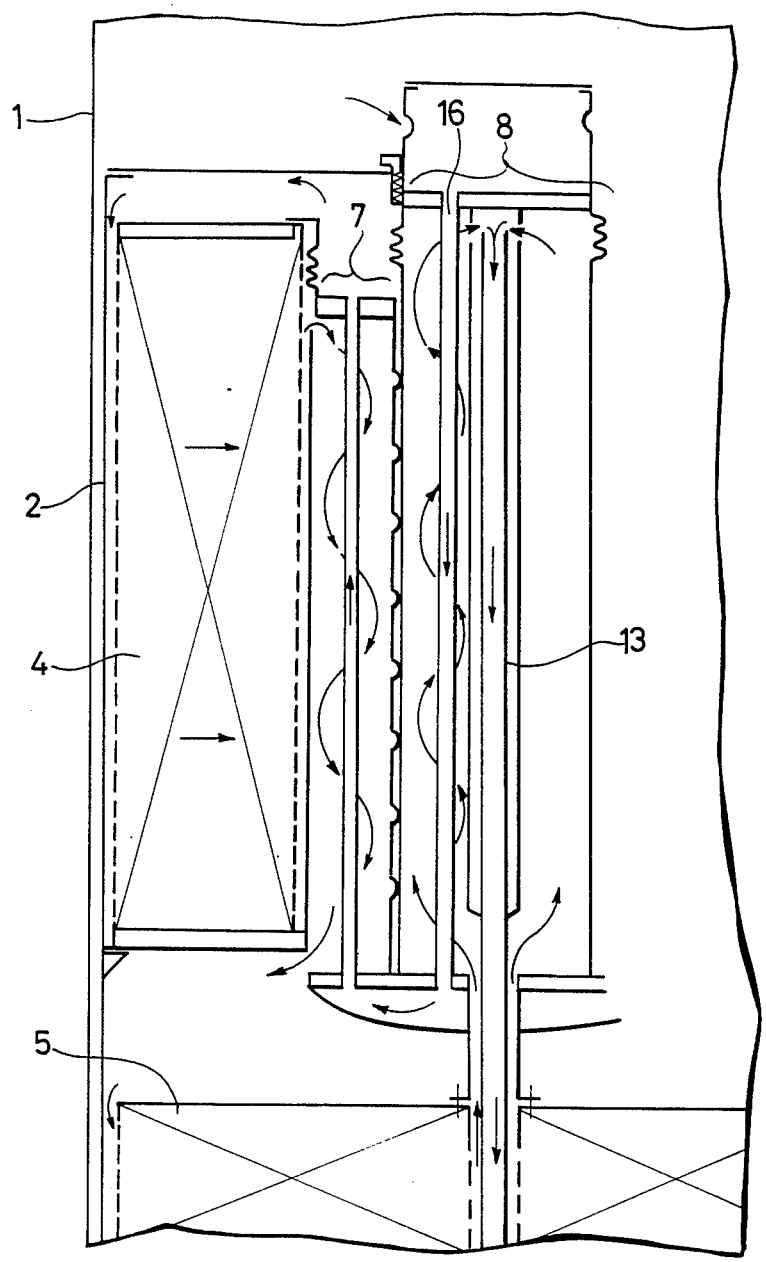
FIG. 2 is a fragmentary vertical cross-section of another embodiment in which the design of a second heat exchanger 8 in FIG. 1 has been modified.

The above embodiments of this invention will hereinafter be described with reference to the accompanying drawings.

Referring first to FIG. 1, the reactor comprises a reaction vessel 1, three catalyst beds housed within the reaction vessel 1, namely, a first catalyst bed 4, a second catalyst bed 5 and a third catalyst bed 6 arranged in that order one below another, and a first heat exchanger 7 and a second heat exchanger 8 both provided in the central opening inside the first catalyst bed 4.

The catalyst beds 4,5,6 are each coaxial with the vertical central axis of the reactor vessel 1 and are individually formed of an annular shape. The catalyst beds 4, 5 and 6 are each defined radially by air-transmitting inner and outer cylindrical walls, are closed at the upper and lower ends thereof by horizontal upper and lower end plates and have an annular configuration in horizontal cross-section. A catalyst is packed within the annular portion of each catalyst bed. In the illustrated embodiment, the reaction gas is allowed to flow radially through each of the catalyst beds from the outer cylindrical wall toward the inner cylindrical wall.

The first heat exchanger 7 is provided inside the radially outer portion of the central opening of the first catalyst bed 4 and the second heat exchanger 8 is disposed in said central opening radially inside of the first heat exchanger, whereby all of these elements 4, 7 and 8 are arranged concentrically as viewed in plan view so that they are coaxial with the vertical central axis of the reaction vessel 1 and are located at substantially the same vertical height relative to the bottom of the reaction vessel.

A first bypass 10 and second bypass 11 are provided to introduce a cooling gas from the outside so as to control the temperature of the reaction gas at various locations in the reaction vessel 1. The reaction gas is, however, not diluted by the cooling gas since the cooling gas is not mixed with the reaction gas.

Shell-and-tube heat exchangers are used as the heat exchangers in many reaction systems. Here, parts of one heat exchanger, such as a shell and tube plate, may often be used commonly as parts of the other heat exchanger or the corresponding catalyst bed. In the illustrated embodiment, the inner shell 7A of the first heat exchanger 7 also serves as the outer shell of the second heat exchanger 8 and the outer shell 17 of the first heat exchanger 7 also serves as a partition to isolate the first heat exchanger 7 from the space in which the first catalyst bed 4 is placed.

Disposed in proximity to the inner side wall of the reaction vessel 1 are first and second inner cylinders 2,3, in which the above-described catalyst beds 4,5,6 and heat exchangers 7,8 are arranged. The first and second inner cylinders 2,3 serve as structural elements for holding these internal units 4,5,6,7 and 8 and also as thermal shields for the reactor vessel 1. The narrow annular space defined between the reaction vessel 1 and the first inner cylinder 2 and that space formed between the first and second inner cylinders 2,3 are used as gas flow passages.

The flow and effects of the gas will next be described.

An unreacted fresh gas enters the reactor through a gas inlet 14, flows upwardly in the space between the reaction vessel 1 and first inner cylinder 2, enters the upper end of the shell side of the second heat exchanger 8, undergoes exchange of heat with reaction gas discharged from the second catalyst bed 5, and then flows out through the lower end of said second heat exchanger 8. Next, the fresh gas enters the tubes of the first heat exchanger 7 through the lower ends thereof, undergoes exchange of heat with reaction gas discharged from the first catalyst bed 4 and thereby is heated to the initiation temperature of the catalytic reaction, and then flows out through the upper end of the heat exchanger 7. The thus-heated fresh gas thereafter enters the first catalyst bed 4 through the outer cylindrical wall thereof so that the fresh gas is subjected to the catalytic reaction as it flows radially inwardly through said first catalyst bed 4. The resultant reaction gas then enters the shell side of the first heat exchanger 7 at the upper end thereof, is cooled therein, and flows out through the lower end thereof. Subsequently, the thus-cooled reaction gas enters the second catalyst bed 5 through the outer cylindrical wall thereof, whereby the reaction gas is subjected further to the catalytic reaction. The resulting reaction gas which has flowed out through the inner cylindrical wall of the second catalyst bed 5 enters the tubes of the second heat exchanger 8, where the reaction gas itself is cooled as a result of transfer of its heat to the supply of the fresh gas. Thereafter, the reaction gas flows through a pipe 12 and then through the space between the first inner cylinder 2 and second inner cylinder 3, is eventually subjected to the catalytic reaction in the third catalyst bed 6, and then flows out of the reactor through a gas outlet 15.

The embodiment of FIG. 2 is substantially the same as the embodiment of FIG. 1 except that the design of the second heat exchanger 8 has been modified.

In the embodiment depicted in FIG. 2, the gases which flow respectively through the shell and tubes of the second heat exchanger 8 are opposite to those in the embodiment of FIG. 1. Namely, the fresh gas enters the upper ends of the tubes 16 of the second heat exchanger 8, while the reaction gas flowed out of the second catalyst bed 5 flows upwardly and enters the lower end of the shell side of the second heat exchanger 8. After the reaction gas from catalyst bed 5 has been subjected to heat exchange with the fresh gas, the reaction gas flows downwardly through a central discharge pipe 13 from the upper end of the shell and then flows into the third catalyst bed 6 through the cylindrical inner wall thereof.

The above-described structure makes the second inner cylinder 3 unnecessary, thereby simplifying the structure of the reactor.

Figure 3:
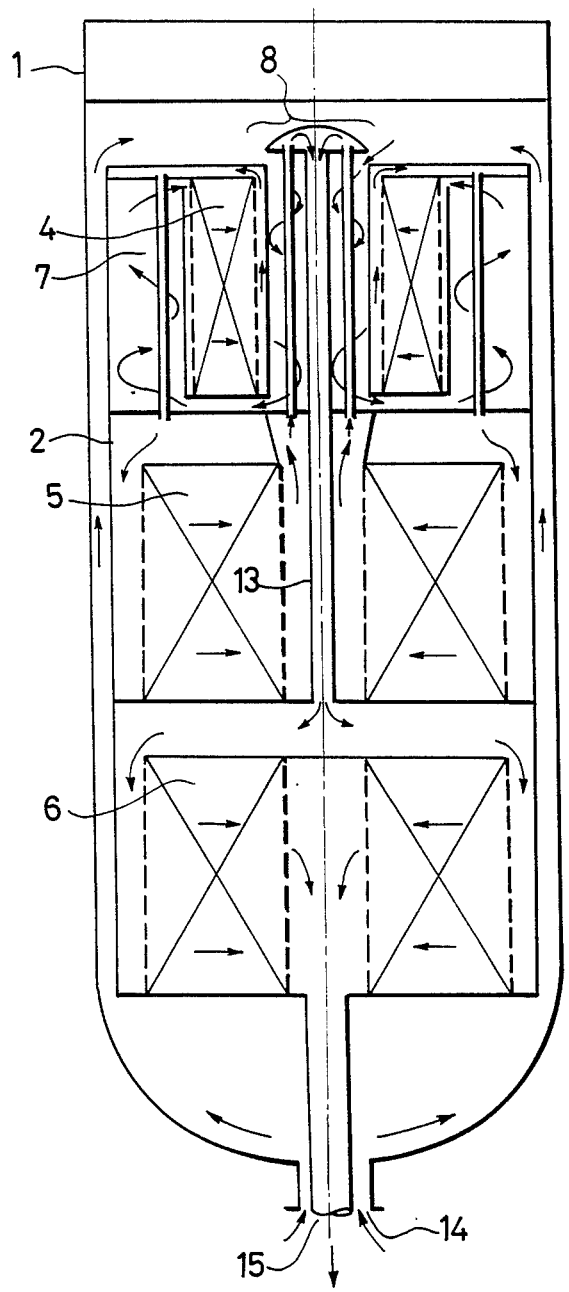
FIG. 3 is a vertical cross-section of a further embodiment of the reactor for the synthesis of ammonia, in which two heat exchangers are provided, one being outside one of catalyst beds and the other inside the same catalyst bed.

Referring next to FIG. 3, the first heat exchanger 7 is provided outside the first catalyst bed 4, while the second heat exchanger 8 is disposed inside the first catalyst bed 4. The first and second heat exchangers 7,8 and the first catalyst bed 4 are provided concentrically as viewed in plan view so that they are located coaxial with the vertical central axis of the reaction vessel 1 and substantially at the same height.

Figure 4:
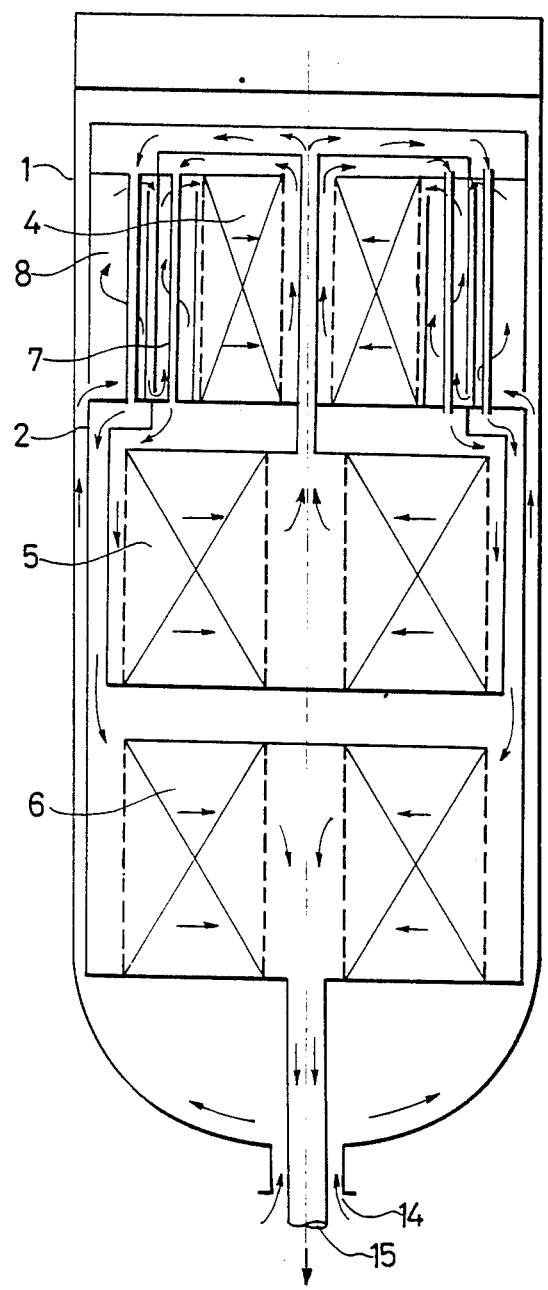
FIG. 4 is a vertical cross-section of a still further embodiment of the reactor for the synthesis of ammonia, in which two heat exchangers are both provided outside one of the catalyst beds.

In the embodiment shown in FIG. 4, the first heat exchanger 7 is provided outside the first catalyst bed 4 and the second heat exchanger 8 is provided further radially outside the first heat exchanger 7. The first and second heat exchangers 7,8 and the first catalyst bed 4 are provided concentrically as viewed in plan view so that they are located coaxial with the vertical central axis of the reaction vessel 1 and at substantially the same height.

The flows of gases in FIGS. 3 and 4 are apparent from the respective drawings and their description is hence omitted.

As has been described above in detail, the following advantages inter alia have been brought about by providing a catalyst bed and at least two heat exchangers coaxial with the vertical central axis of the reaction vessel and disposed at substantially the same vertical height.

(1) Heat exchangers, the structures of which are complex compared with the other elements in a catalytic reactor, can be centered especially in an uppermost part where the maintenance of the heat exchangers is easy, thereby facilitating work such as assembly and disassembly of the heat exchangers.

(2) The structures of catalyst beds, in which no heat exchanger is built in, can be simplified and their maintenance is hence facilitated.

(3) The overall structure of the catalytic reactor is simplified, leading to a lower manufacturing cost.

We claim:

1. A vertical catalytic reactor wherein a reaction gas is contacted with solid catalyst means to cause an exothermic conversion reaction whereby to produce a reaction product gas, comprising: an upright reaction vessel having a vertical central axis; a plurality of catalyst beds within said reaction vessel, said catalyst beds being coaxial with and arranged in a vertical stack along said vertical central axis and arranged for sequential flow of said reaction gas therethrough, each of said catalyst beds being composed of a top wall, a bottom wall and inner and outer, cylindrical, perforate, gas-transmitting, upright, side walls, said walls defining an annular space which is packed with the solid catalyst and through which said reaction gas can flow radially; a plurality of heat exchangers in said vessel and coaxial with said vertical central axis, said heat exchangers being connected to said catalyst beds for cooling the effluent reaction gas from each catalyst bed before it is flowed into the next one of said sequentially arranged catalyst beds, at least two of said heat exchangers being disposed in the upper portion of said reaction vessel at substantially the same vertical level therein as the uppermost catalyst bed, said two heat exchangers including first passage means for flowing the effluents from two of said catalyst beds separately to said two heat exchangers, respectively, so that said effluents are separately cooled in said two heat exchangers, and second passage means for flowing the feed reaction gas being fed into said reactor through said two heat exchangers in series and in indirect heat exchange relationship with said effluents in said two heat exchangers so that said feed reaction gas acts as colder gas in said two heat exchangers, and conduit means for removing the effluent gas from the last of said catalyst beds as said reaction product gas.

2. The reactor as claimed in claim 1, wherein the reaction gas flows radially from the outer cylindrical side wall toward the inner cylindrical side wall in each of the catalyst beds.

3. The reactor as claimed in claim 1, wherein the reaction gas flows radially from the inner cylindrical side wall toward the outer cylindrical side wall in each of the catalyst beds.

4. The reactor as claimed in claim 1, wherein the reaction gas flows radially from the outer cylindrical side wall toward the inner cylindrical side wall in at least one of the catalyst beds and the reaction gas flows radially from the inner cylindrical side wall toward the outer cylindrical side wall in at least one of the remaining catalyst beds.

5. The reactor as claimed in claim 1, wherein said at least two heat exchangers are arranged radially inside said uppermost catalyst bed.

6. The reactor as claimed in claim 1, wherein one of said two heat exchangers is arranged radially inside of said uppermost catalyst bed and the other of said two heat exchangers is arranged radially outside said uppermost catalyst bed, respectively.

7. The reactor as claimed in claim 1, wherein said at least two heat exchangers are arranged radially outside said uppermost catalyst bed.

8. A vertical catalytic reactor as claimed in claim 1 in which each of said two heat exchangers is a shell-and-tube heat exchanger.

9. A vertical catalytic reactor as claimed in claim 8 in which said shell-and-tube heat exchangers are coaxial with said vertical central axis.

* * * * *